US011929228B2

(12) United States Patent
Geffroy et al.

(10) Patent No.: US 11,929,228 B2
(45) Date of Patent: Mar. 12, 2024

(54) METHOD OF MOUNTING AN INTERLOCK MODULE BETWEEN TWO CONTACTORS AND AN INTERLOCK MODULE

(71) Applicant: Schneider Electric Industries SAS, Rueil-Malmaison (FR)

(72) Inventors: Vincent Geffroy, Rueil-Malmaison (FR); Zhiping Huan, Shanghai (CN); Shaofan Li, Shanghai (CN); Cheng Huang, Shanghai (CN)

(73) Assignee: Schneider Electric Industries SAS, Rueil-Malmaison (FR)

(*) Notice: Subject to any disclaimer, the term of this patent is extended or adjusted under 35 U.S.C. 154(b) by 0 days.

(21) Appl. No.: 17/828,265

(22) Filed: May 31, 2022

(65) Prior Publication Data

US 2022/0384124 A1 Dec. 1, 2022

(30) Foreign Application Priority Data

May 31, 2021 (CN) ........................ 202110604304.9

(51) Int. Cl.
*H01H 9/20* (2006.01)

(52) U.S. Cl.
CPC .................................... *H01H 9/20* (2013.01)

(58) Field of Classification Search
CPC ............ H01H 9/20; H01H 9/26; H01H 19/64; H01H 19/00; H01H 51/00; H02B 1/20
(Continued)

(56) References Cited

U.S. PATENT DOCUMENTS 6,184,595 B1 2/2001 Flegel, Jr.
6,927,349 B1 * 8/2005 Flegel ...................... H01H 9/26 200/50.01
2014/0246295 A1 9/2014 Eriksson et al.

FOREIGN PATENT DOCUMENTS

CN 210956495 U 7/2020
EP 3561836 A2 10/2019
(Continued)

OTHER PUBLICATIONS

Extended European Search Report dated Oct. 31, 2022 for corresponding European Patent Application No. 22305787.8-1201, 14 pages.
(Continued)

*Primary Examiner* — Renee S Luebke
*Assistant Examiner* — Iman Malakooti
(74) *Attorney, Agent, or Firm* — Locke Lord LLP

(57) ABSTRACT

A method for mounting an interlock module between two contactors, including: providing a first contactor having a first mounting surface and a first movable iron core assembly and a second contactor having a second mounting surface and a second movable iron core assembly, and placing the first mounting surface and the second mounting surface face to face; providing the interlock module comprising a first slider, a second slider and a housing formed separately from the first slider and the housing, an interlocking portion being mounted in the housing for interacting with the first slider and the second slider; connecting the first slider to the first movable iron core assembly of the first contactor; connecting the second slider to the second movable iron core assembly of the second contactor; assembling the housing to the first slider and the second slider; and fixing the housing.

16 Claims, 5 Drawing Sheets

(58) Field of Classification Search
USPC .......................................... 200/50.01, 50.32
See application file for complete search history.

(56) References Cited

FOREIGN PATENT DOCUMENTS

| | | | | |
|---|---|---|---|---|
| JP | 5957812 | U | 4/1984 | |
| JP | H01246739 | * | 2/1989 | ............ H01H 51/00 |
| JP | H01246739 | A | 10/1989 | |
| JP | 200964737 | A | 3/2009 | |

OTHER PUBLICATIONS

Indian Office Action dated Dec. 14, 2022 for corresponding Indian Patent Application No. 202244031065, 6 pages.

* cited by examiner

METHOD OF MOUNTING AN INTERLOCK MODULE BETWEEN TWO CONTACTORS AND AN INTERLOCK MODULE

The application claims priority from the Chinese patent application No. 202110604304.9, filed on May 31, 2021, the entire disclosure of which is incorporated herein by reference as part of the present application.

TECHNICAL FIELD

The present invention relates to a method of mounting an interlock module between two contactors, an interlock module for interlocking between two contactors, and an associated control system.

BACKGROUND

In the prior art, in the case where assembling, for example, two contactors for controlling a forward rotation and reverse rotation of a motor, and a starting of a star-delta of the motor, or a switching between a first power supply and a second power supply, and an interlock module for interlocking between the two contactors, it is necessary to mount a first contactor of the two contactors and fix it relative to a base plate first, then mount the interlock module to the first contactor, and then mount a second contactor of the two contactors to the interlock module, thereby completing the assembling process. Correspondingly, in the case where the interlock module needs to be disassembled, one of the two contactors needs to be disassembled from the interlock module first, and then the interlock module is disassembled from the other contactor. On the one hand, it is time-consuming and laborious to mount a larger and heavier contactor to a smaller and lighter interlock module, or to remove a larger and heavier contactor from a smaller and lighter interlock module; on the one hand, a traditional assembly and disassembly process is extremely complicated and procedures are cumbersome.

Therefore, there is a need for a method that can mount an interlock module to the two contactors in a removable way.

SUMMARY

To this end, according to one aspect of the present invention, a method for mounting an interlock module between two contactors is proposed, wherein the interlock module in an assembled state serves to ensure that when one of two contactors is switched on, the other of the two contactors is blocked from being switched on, and the method comprises at least the following steps:

Step 1: Providing two contactors, including a first contactor having a first mounting surface and a first movable iron core assembly and a second contactor having a second mounting surface and a second movable iron core assembly, and placing the first contactor and the second contactor side by side with a gap therebetween, so that the first mounting surface faces the second mounting surface, Step 2: Providing the interlock module comprising a first slider, a second slider and a housing formed separately from the first slider and the second slider, an interlocking portion being mounted in the housing for interacting with the first slider and the second slider to generate an interlocking effect, Step 3: Connecting the first slider to the first movable iron core assembly of the first contactor through the first mounting surface, Step 4: Connecting the second slider to the second movable iron core assembly of the second contactor through the second mounting surface, Step 5: Assembling the housing to the first slider and the second slider, Step 6: Removably fixing the housing, wherein the order of step 3 and step 4 can be interchanged.

Furthermore, various embodiments of the method according to the first aspect of the invention may further optionally comprise one or more of the following further developments.

In some embodiments, the method further comprises:

Step a: fixing the first contactor, wherein the step a can take place before step 3, Step b: fixing the second contactor, wherein the step b can take place before step 4.

In some embodiments, one screw and nut assembly comprising a screw and a nut cooperating with each other is provided in the housing of the interlock module provided in step 1, a stopper being provided in the first mounting surface of the first contactor and/or the second mounting surface of the second contactor and provided with a side stopper surface and a top stopper surface; the above step 6 may comprise a sub-step 6.1: rotating the screw along a locking direction by a certain angle to bring the nut to enter the stopper, so that the nut can be stopped by abutting against the side stopper surface, during which there is no relative rotation between the screw and the nut.

In some embodiments, the above step 6 further comprises a sub-step 6.2: continuing screwing the screw in the locking direction, so as to rotate the screw relative to the nut until the head of the screw abuts against an abutment surface on the housing.

In some embodiments, the above step 6 further comprises a sub-step 6.3: continuing screwing the screw in the locking direction, so as to rotate the nut relative to the screw until the nut is stopped by abutting against the top stopper surface.

In some embodiments, the first slider and the second slider are respectively provided with a first pin and a second pin, while the first movable iron core assembly of the first contactor is provided with a first mounting hole, and the second movable iron core assembly of the second contactor is provided with a second mounting hole, wherein the step 3 comprises mounting the first pin of the first slider into the first mounting hole of the first movable iron core assembly of the first contactor, and the step 4 comprises mounting the second pin of the second slider into the second mounting hole of the second movable iron core assembly of the second contactor.

In some embodiments, in the interlock module provided in the step 1, the housing is provided with a notch located on a side and a first receptacle and a second receptacle communicating with the notch, and wherein the step 5 comprises:

Sub-step 51: moving the housing along an mounting direction, so that the first slider and the second slider enter the first receptacle and the second receptacle through the notch respectively;

Sub-step 52: continuing moving the housing along the mounting direction to reach an assembling position.

In some embodiments, the step a comprises fixing the first contactor to a base plate, and the step b comprises fixing the second contactor to the base plate.

In some embodiments, a threaded hole is provided in the base plate between the first contactor and the second contactor, and a screw is provided in the housing, the Step 6 comprises screwing the screw to the threaded hole.

According to a second aspect of the present invention, an interlock module for interlocking between two contactors is proposed, wherein the interlock module is used to ensure that in the case where one of the two contactors is switched on, the switching on of the other of the two contactors is blocked, the interlocking module is characterized in that it includes:

a first slider for connecting to a first movable iron core assembly of the first contactor of the two contactors, a second slider for connecting to a second movable iron core assembly of the second contactor of the two contactors, and a housing formed separately from the first slider and the second slider, and provided with an interlocking portion for interacting with the first slider and the second slider to produce an interlocking effect.

Furthermore, various embodiments of the interlock module according to the second aspect of the invention may further optionally comprise one or more of the following further developments.

In some embodiments, a side of the housing is provided with a notch, and the housing is provided with a first receptacle and a second receptacle communicating with the notch, the first receptacle being used for receiving the first slider through the notch, and the second receptacle beings used for receiving the second slider through the notch.

In some embodiments, the first slider is provided with a first pin protruding relative to a first body of the first slider for cooperating with the first mounting hole in the first movable iron core assembly of the first contactor, the second slider is provided with a second pin protruding from a second body of the second slider for connecting with the second mounting hole in the second movable iron core assembly of the second contactor cooperation.

In some embodiments, the first receptacle is defined at least by a first outer side of the housing in which a first channel is provided to allow the passage of the first pin, the second receptacle is defined by at least a second outer side of the housing which is opposite to the first outer side and in which a second channel is provided to allow the passage of the second pin.

In some embodiments, at least one screw and nut assembly comprising a screw and a nut cooperating with each other is provided in the housing for removably fixing the housing, wherein:

the screw comprises a head, while the housing comprises an abutment surface for abutting the head, the nut is configured to cooperate with a stopper provided on the first contactor and/or the second contactor, and wherein, in an initial position, the nut is located inside the housing; in an assembled position, screwing the screw enables the head of the screw to abut against the abutment surface, and enables the nut to enter the stopper and to be stopped.

In some embodiments, the first slider and the second slider are configured as mirror of each other.

According to a third aspect of the present invention, a control system is provided, which is used, for example, to control the forward and reverse rotation of a motor and the star-delta start of the motor or control the switching between the first power supply and the second power supply, comprising a first contactor and a second contactor, and an interlock module according to one or more of the above-described embodiments.

Optionally, in the control system according to the third aspect of the present invention, the first contactor and the second contactor are arranged side by side, and respectively comprise a first mounting surface first and a second mounting surface facing each other, wherein the first slider is connected to the first movable iron core assembly of the first contactor through the first mounting surface, and the second slider is connected to the second movable iron core assembly of the second contactor through the second mounting surface.

DETAILED DESCRIPTION

Figure 1:
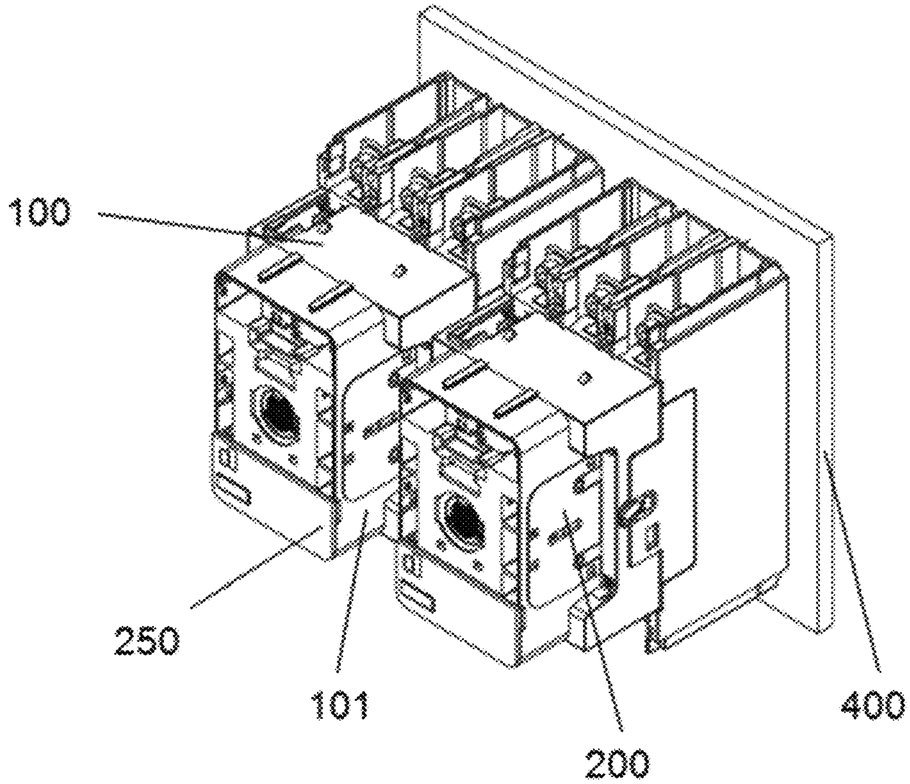
FIG. 1 is a perspective diagram of two contactors mounted side by side.

Hereinafter, methods and related products according to embodiments of the present disclosure will be described in detail with reference to the accompanying drawings. In order to make the purpose, technical solutions and advantages of the present disclosure more clear, technical solutions in embodiments of the present disclosure will be clearly and completely described below with reference to the accompanying drawings in the embodiments of the present disclosure. Obviously, the described embodiments are partial, but not all, embodiments of the present disclosure are disclosed.

Therefore, the following detailed description of the embodiments of the present disclosure provided in connection with the appended drawings is not intended to limit the scope of the disclosure as claimed, but is merely representative of selected embodiments of the disclosure. Based on the embodiments in the present disclosure, all other embodiments obtained by those of ordinary skill in the art without creative efforts shall fall within the protection scope of the present disclosure.

The singular includes the plural unless the context defines otherwise. Throughout the specification, the terms “comprising”, “having”, etc. are used herein to designate the presence of stated features, numbers, steps, operations, elements, components or combinations thereof, but do not preclude the presence or addition of one or more other features, numbers, steps, operations, elements, components or combinations thereof.

In addition, even though terms including ordinal numbers such as "first", "second", etc. may be used to describe various components, these components are not limited by these terms, and these terms are only used to distinguish one element from other elements. For example, a first element could be termed a second element, and, similarly, a second element could be termed a first element, without departing from the scope of the present disclosure.

In the description of the present invention, it should be understood that the orientations or positional relationships indicated by the terms "upper", "lower", "left", "right", "inner", "outer", etc. are based on those shown in the accompanying drawings the orientation or positional relationship, or the orientation or positional relationship that the disclosed product is usually placed in use, or the orientation or positional relationship commonly understood by those skilled in the art, are only for the convenience of describing the present disclosure and simplifying the description, rather than indicating or implying that the device or element referred to must have a particular orientation, be constructed and operate in a particular orientation, and therefore should not be construed as a limitation of the present disclosure.

Figure 2:
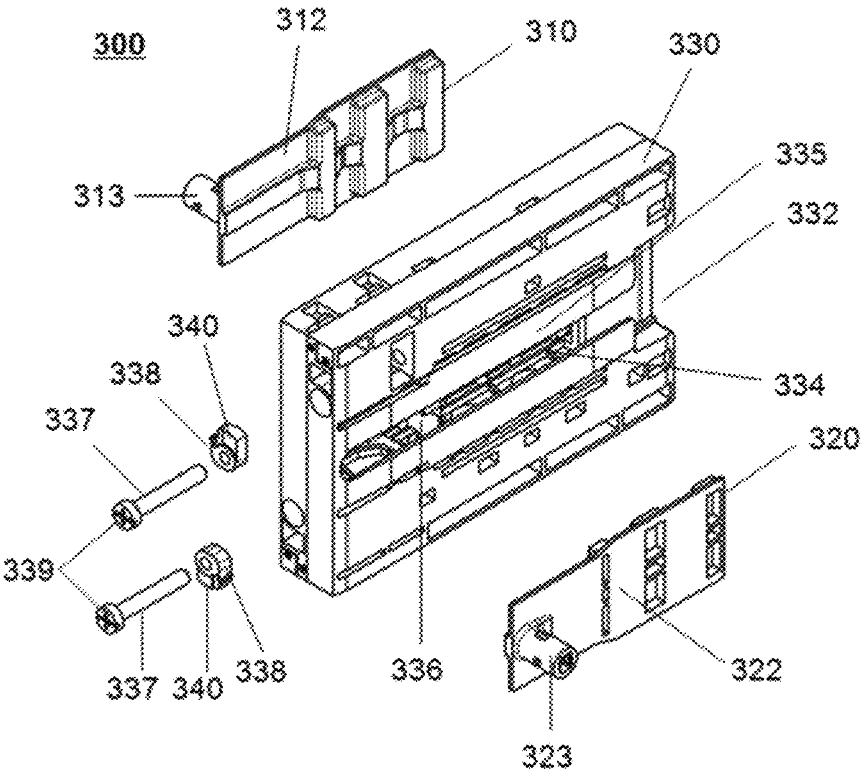
FIG. 2 is an exploded perspective diagram of an interlock module according to an embodiment of the present disclosure.
Figure 3:
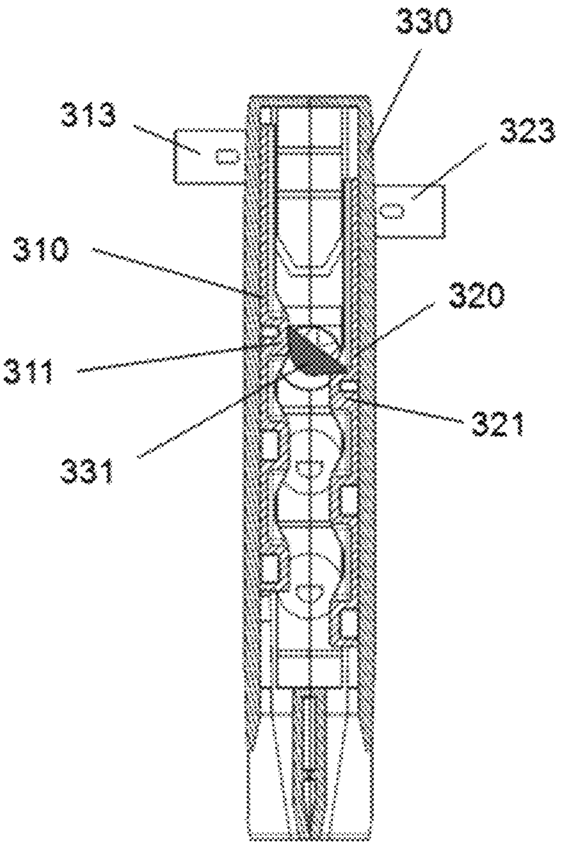
FIG. 3 is a cross-sectional diagram of the interlock module according to an embodiment of the present disclosure.
Figure 4:
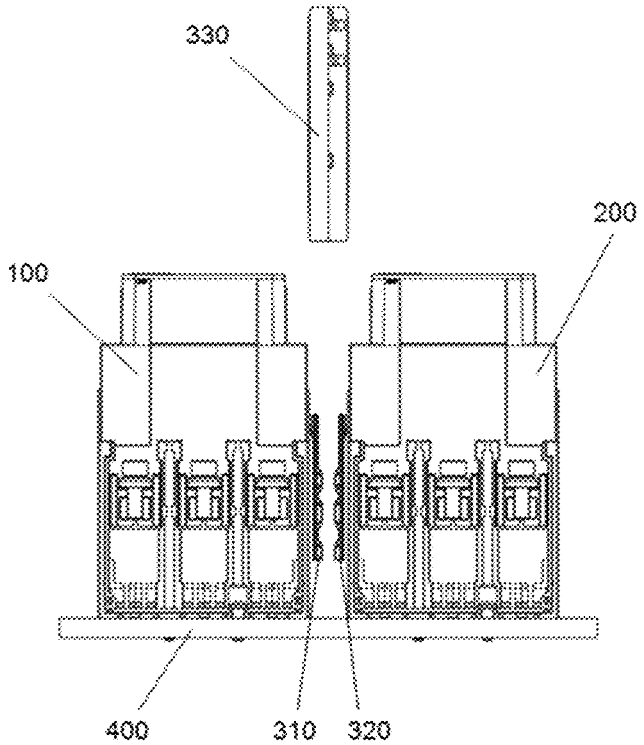
FIG. 4 illustrates how to mount a housing of the interlock module to a first slider and a second slider that have been connected to a first contactor and a second contactor respectively according to an embodiment of the present disclosure.
Figure 5:
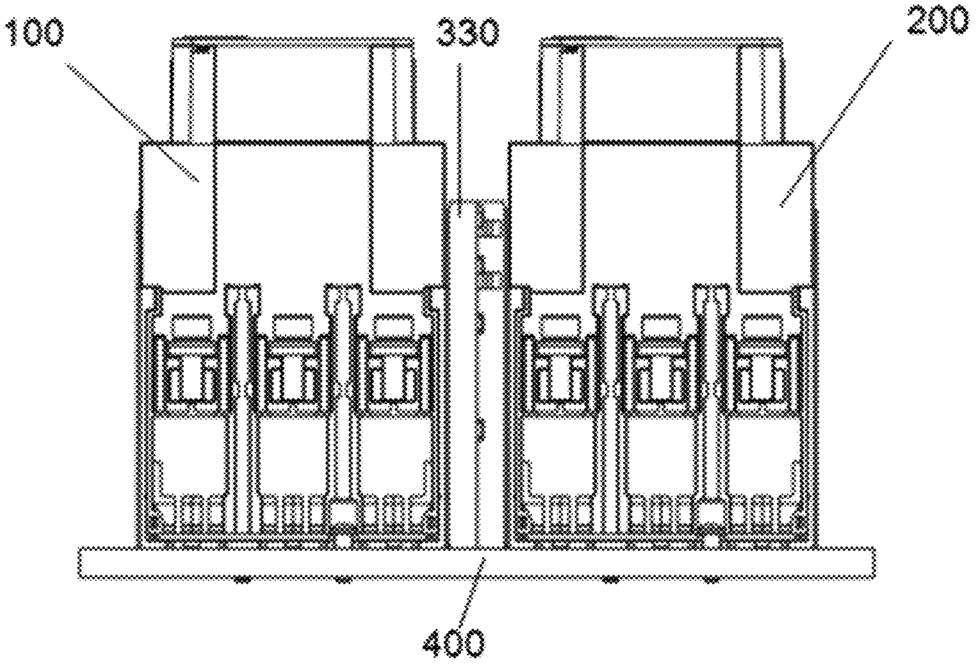
FIG. 5 illustrates that the housing of the interlock module has been mounted in place.

In a first aspect according to the present disclosure, as illustrated in FIG. 1-FIG. 5, a method for mounting an interlock module 300 between two contactors, for example a current collector, is proposed, wherein the interlock module 300 is configured to, in an assembled state, ensure that in the case where one of the two contactors is switched on, the switching on of the other of the two contactors is blocked, the method comprising at least the following steps:

Step 1: Providing two contactors, as illustrated in FIG. 1 and FIG. 4-FIG. 5, including a first contactor 100 having a first mounting surface 101 and a first movable iron core assembly (not illustrated) and a second contactor 200 having a second mounting surface 201 and a second movable iron core assembly (not illustrated), and placing the first contactor 100 and the second contactor 200 side by side with a gap therebetween, so that the first mounting surface 101 faces the second mounting surface 201;

Step 2: Providing an interlock module 300, as illustrated in FIG. 2-FIG. 3, the interlock module 300 comprising a first slider 310, a second slider 320 and a housing 330, and the housing 330 formed separately from the first slider 310 and the second slider 320. An interlocking portion 331 is mounted in the housing 330 for interacting with the first slider 310 and the second slider 320 to generate an interlocking effect; for example, the interlocking portion 331 is rotatably mounted in the housing 330, and the first slider 310 and the second slider 320 are respectively provided with a first mating interlocking portion 311 and a second mating interlocking portion 321, with which the interlocking portion 331 can interact to lock the slider 310 and the second sliding 320; that is, for example, in the case where the first contactor 100 is switched on, the first slider 310 and the second slider 320 can cooperate with the interlocking portion 331 to produce the interlocking effect to lock the second contactor 200 from being switched on; and vice versa;

Step 3: As illustrated in FIG. 4, connecting the first slider 310 to the first movable iron core assembly of the first contactor 100 through the first mounting surface 101; thus, in the case where the first contactor 100 is closed, an upward movement of the first movable iron core assembly will drive the first slider 310 to move upward, and in the case where the first contactor 100 is disconnected, a downward movement of the first movable iron core assembly will drive the first slider 310 to move downward;

Step 4: As illustrated in FIG. 4, connecting the second slider 320 to the second movable iron core assembly of the second contactor 200 through the second mounting surface 201; thus, in the case where the second contactor 200 is closed, an upward movement of the second movable iron core assembly will drive the second slider 320 to move upward, and in the case where the second contactor 200 is disconnected, a downward movement of the second movable iron core assembly will drive the second slider 320 to move downward;

Step 5: As illustrated in FIG. 5, assembling the housing 330 to the first slider 310 and the second slider 320;

Step 6: Removably fixing the housing 330, wherein FIG. 6-FIG. 10 illustrate part of the fixing process;

wherein the order of step 3 and step 4 can be interchanged.

According to some embodiments, the method further comprises:

Step a: fixing the first contactor 100, which can take place before step 3, that is, the first slider 310 can be mounted following the fixing of the first contactor 100 on, for example, a base plate 400 (illustrated in FIG. 1 and FIG. 4-FIG. 6);

Step b: fixing the second contactor 200, which can take place before step 4, that is, the second slider 320 can be mounted following the fixing of the second contactor 200 on, for example, the base plate 400 (illustrated in FIG. 1 and FIG. 4-FIG. 6).

More specifically, once both of the first contactor 100 and the second contactor 200 are fixed to the base plate 400, the first slider 310 and the second slider 320 can be mounted, respectively. That is, after the first contactor 100 and the second contactor 200 are fixed in place, the gap between the first contactor 100 and the second contactor 200 allows the first sliding 310 and the second sliding 320 to be inserted therein and to be mounted to the corresponding first movable iron core assembly and second movable iron core assembly.

Therefore, in this method, the first slider 310, the second slider 320 and the housing 330 of the interlock module 300 are all allowed to be mounted in place from a front face 250 of the first contactor 100 and the second contactor 200, and thus there is no need to first mount one of the first contactor 100 and the second contactor 200 in place, and then mount the interlock module to the in-place contactor, and finally mount the other contactor to the interlock module, as in the prior art. Thus, the method according to the present discourse can save time and effort in the assembly process and allow, in case where a maintenance is required, the interlock module to be accessible and disassembled without disassembling the first contactor and second contactor.

In a specific embodiment, as illustrated in FIG. 2-FIG. 3, the first slider 310 and the second slider 320 are respectively provided with a first pin 313 protruding from a first body 312 of the first slider 310 and a second pin 323 protruding from a second body 322 of the second sliding 320, the first movable iron core assembly of the first contactor 100 being provided with a first mounting hole, and the second movable iron core assembly of the second contactor being provided with a second mounting hole. In this case, the above step 3 may comprise mounting the first pin 313 of the first slider 310 into the first mounting hole of the first movable iron core assembly of the first contactor 100, and the above step 4 may comprise mounting the second pin 323 of the second slider 320 into the second mounting hole of the second movable iron core assembly of the second contactor 200. And more specifically, the first mounting surface 101 of the first contactor 100 and the second mounting surface 201 of the second contactor 200 may be provided with holes (not illustrated) respectively allowing the first pin 313 and the second pin 323 to pass through, so that the first pin 313 and the second pin 323 can respectively protrude into the first mounting hole of the first movable iron core assembly and the second mounting hole (not illustrated) of the second movable iron core assembly.

In a specific embodiment, as illustrated in FIG. 2-FIG. 3, in the interlock module 300 provided in the above step 1, the housing 330 is provided with a notch 332 located on a side and a first receptacle 334 and a second receptacle (not illustrated) communicating with the notch 332, and in this case, the step 5 above may comprise:

Sub-step 51: Moving the housing 330 along an mounting direction (along a downward direction in FIG. 4), so that the first slider 310 and the second slider 320 enter the first receptacle 334 and the second receptacle (not illustrated) through the notch 332 respectively. FIG. 3 illustrates that the first slider 310 and the second slider 320 are in the first receptacle and the second receptacle in the housing 330;

Sub-step 5.2: continuing moving the housing 330 along the mounting direction to reach an assembling position, as illustrated in FIG. 5, in which the housing 330 has reached the assembling position.

As illustrated in FIG. 2, more specifically, the first receptacle 334 is defined by at least a first outer side 335 of the housing 330 in which a first channel 336 for allowing the first pin 313 of the slider 310 to pass through is provided. And correspondingly, the second receptacle is defined by at least a second outer side of the housing which is opposite to the first outer side 335 and in which a second channel for allowing the second pin 323 to pass through is provided. Thus, the arrangement of the first channel 336 and the second channel makes it possible to let the first pin 313 and the second pin 323 enter the first channel 336 and the second channel respectively when assembling the housing to the first slider 310 and the second slider 320 after mounting the first slider 310 and the second slider 320 to the respective first contactor 100 and second contactor 200 through the first pin 313 and the second pin 323 respectively, enabling to guide the movement of the housing 330 while allowing the assembly of the housing 330, and to guide the sliding of the corresponding first slider 310 and the second slider 320 in the operation of the interlocking module. That is, the first slider 310 and the second slider 320 are arranged so that, during the operation of the interlock module 300—for example, during switching between the first contactor 100 and the second contactor 200—they can slide up and down in the corresponding first receptacle 314 and the second receptacle. In addition, the first receptacle and the second receptacle of the housing may further be provided with guide grooves for guiding the sliding of the first slider and the second slider, respectively.

Figure 6:
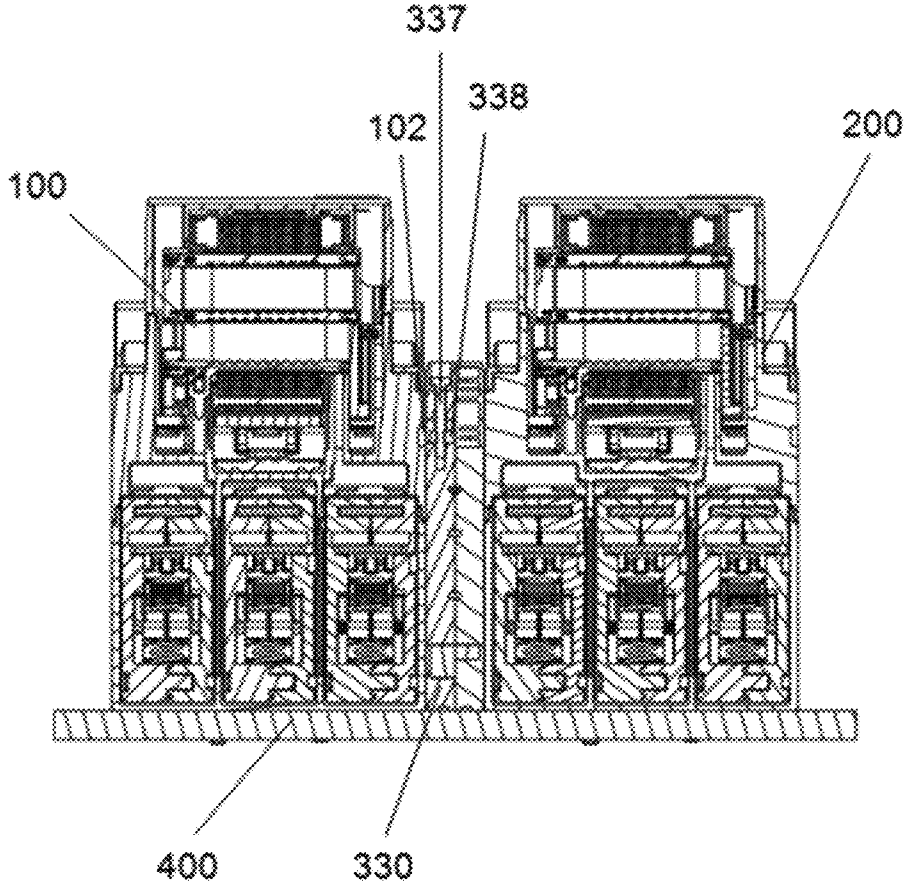
FIG. 6 illustrates a screw and nut assembly for mounting the housing of the interlock module.
Figure 7:
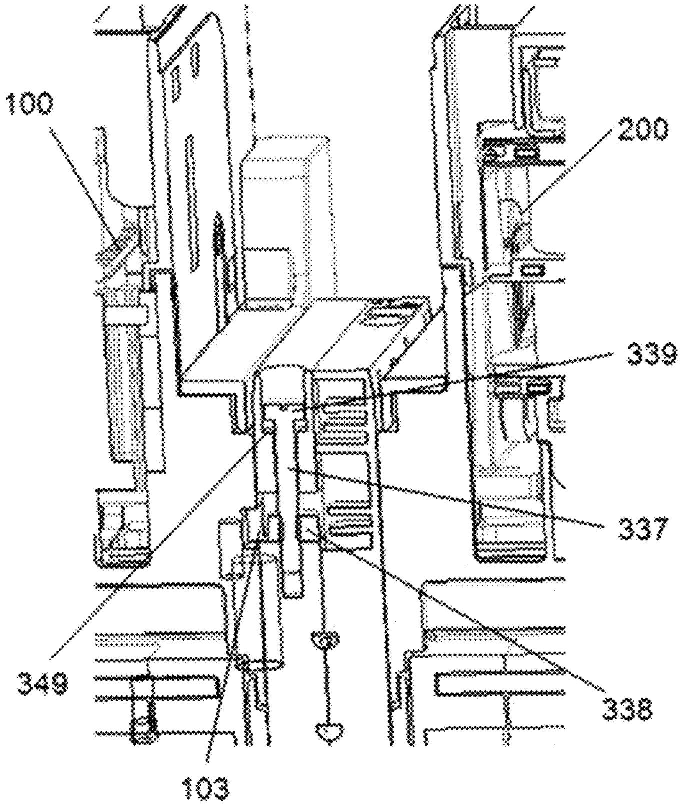
FIG. 7 illustrates an initial position of the screw and nut assembly in a partially enlarged perspective cross-sectional diagram.
Figure 8:
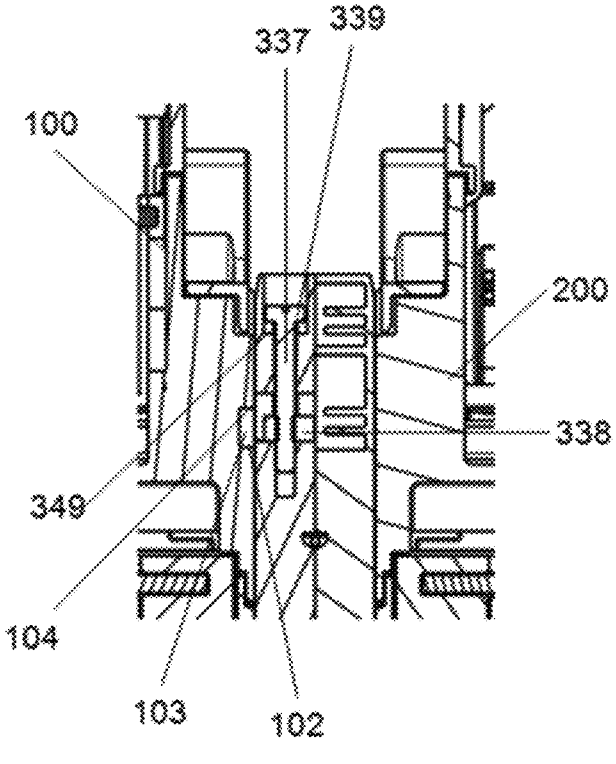
FIG. 8 is a cross-sectional diagram corresponding to FIG. 7.

In a specific embodiment, as illustrated in FIG. 2 and FIG. 6-FIG. 10, at least one screw and nut assembly comprising a screw 337 and a nut 338 cooperating with each other is provided in the housing 330 of the interlock module 300 provided in step 1, a stopper 102 being provided in the first mounting surface 101 of the first contactor 100 and/or the second mounting surface 201 of the second contactor 200 (FIG. 6-FIG. 10 only illustrate the stopper 102 in the first contactor 100), and provided with a side stopper surface 103 and a top stopper surface 104 (as illustrated in FIG. 6-FIG. 8).

In this case, the above step 6 may comprise a sub-step 6.1: rotating the screw 337 along the locking direction (in the figure is a clockwise direction) by a certain angle, for example, 90°, to drive the nut 338 to enter the stopper 102 from the housing of the interlock module 300; for example, the nut 338 may comprise a protrusion 340 which may enter the stopper 102, so that the protrusion 340 of the nut 338 can be stopped by abutting against the side stopper surface 103. During this period, there is no relative rotation between the screw 337 and the nut 338. That is, in the case where the screw and nut assembly is not rotated, the screw and nut assembly is completely inside the housing 330 so as not to affect the assembly of the housing 330 to the first slider 310 and the second slider 320. However, in the case where the housing 330 reaches the assembly position, the nut 338 can be driven to rotate into a corresponding stopper 102 in the first contactor 100 or the second contactor 200 by rotating the screw 337. FIG. 6-FIG. 8 illustrate an initial position of the screw and nut assembly, which is fully within the housing 330, and FIG. 9-FIG. 10 illustrate that the nut has entered the stopper 102 from the housing 330.

Figure 9:
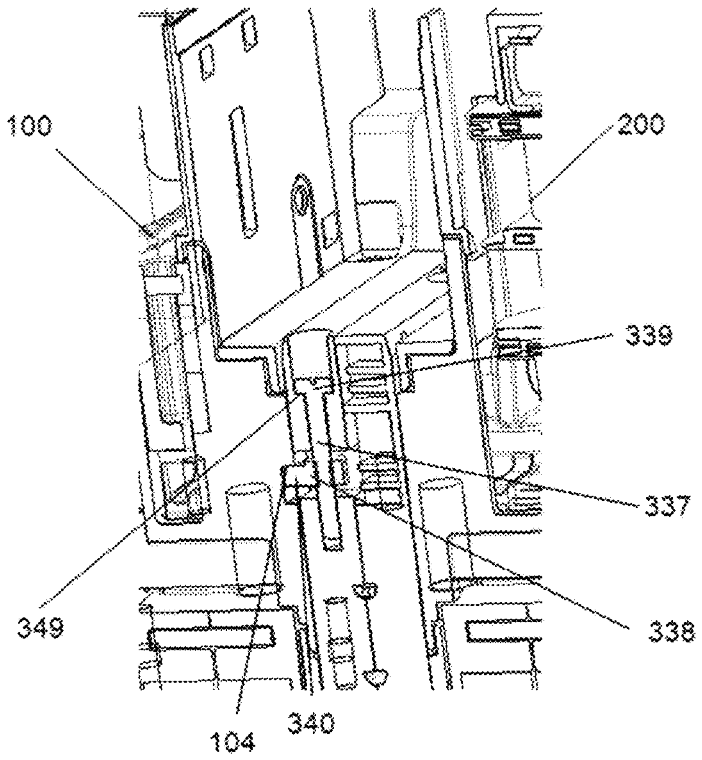
FIG. 9 illustrates a final position of the screw and nut assembly in a partially enlarged perspective cross-sectional diagram.
Figure 10:
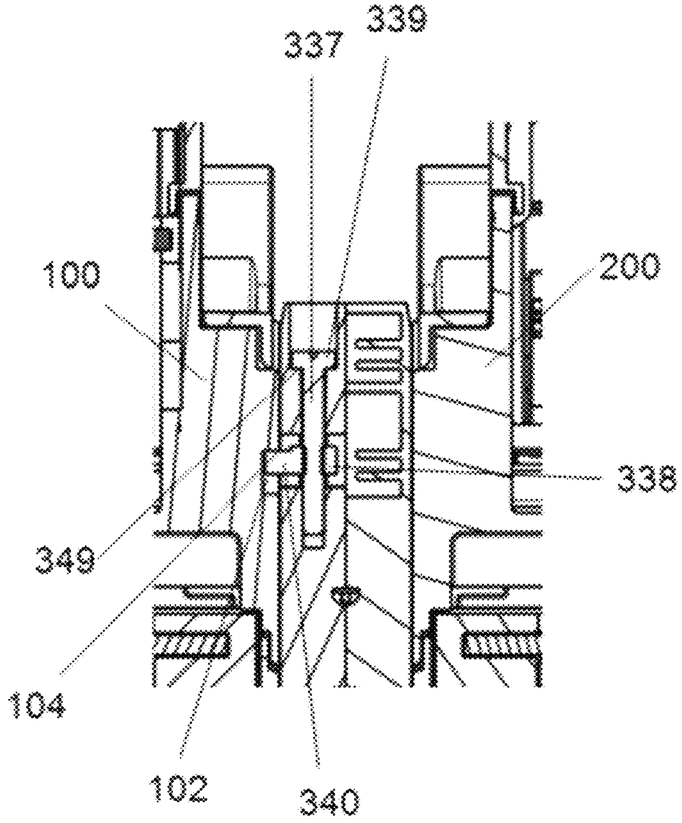
FIG. 10 is a cross-sectional diagram corresponding to FIG. 9.

More specifically, the above step 6 may further comprise a sub-step 6.2: continuing screwing the screw 337 in the locking direction to rotate the screw 337 relative to the nut 338 until the head 339 of the screw 337 abuts against an abutment surface 349 on the housing 330, as illustrated in FIG. 9-FIG. 10. That is, in this sub-step 6.2, since the nut 338 has been stopped by the side stopper surface 103 of the stopper 102, in the case where the screw 337 is kept being rotated in the locking direction, the nut 338 cannot be kept rotating with the screw 337, thereby the screw 337 is screwed relative to the nut 338 until it abuts against the abutment surface 349 on the housing 330, for example, on a side opposite to a side where the notch 332 is located, or other surfaces accessible from the outside, as long as the screw 337 can be screwed with a tool.

More specifically, the above step 6 further comprises a sub-step 6.3: continuing screwing the screw 337 in the locking direction to rotate the nut 338 relative to the screw 337, until the nut 338 is stopped by abutting against the top stopper surface 104. That is, in the sub-step 6.3, because the head 339 of the screw 337 has abutted against the abutment surface 349 on the housing 330, continuing screwing the screw 337 cannot cause the screw 337 to be screwed in deeper, but will exert force to the nut 338 and thus cause it to rotate relative to the screw 337 and to move towards the head 339 of the screw 337, until the nut 338 is stopped by abutting against the top stopped surface 104, that is, at this time the top stopped surface 104 prevents further movement of the nut 338 towards the head 339 of the screw 337. At this time, the housing 330 of the interlock module 300 can be fixed relative to the first contactor 100 and the second contactor 200 regardless of whether the first slider 310 and the second slider 320 slide relative to the housing 330.

It should be noted that at the end of the above sub-step 6.2, the nut 338 may not yet contact the top stopped surface 104, that is, the housing 330 cannot be effectively fixed in the up-down direction as illustrated, which leads to the existence of the sub-step 6.3.

It should be noted that, as illustrated in FIG. 2, two screw-nut assemblies may be arranged in the housing 330 for cooperating with the stopper in the first contactor 100 and the stopper in the second contactor 200, respectively, so as to allow a more stable and reliable fixation of the housing 330.

Therefore, as illustrated in FIG. 3, in the case where the first contactor 100 is switched on and the second contactor 200 is switched off, the first slider 310 is in an upper position with the first movable iron core assembly, and the second slider 320 is in a lower position with the first movable iron core assembly. The interlocking portion 331 in the housing 330 of the interlock module 300 is caught between the first mating interlocking portion 311 of the first slider 310 and the second mating interlocking portion 321 of the second slider 320; at this time, if the second contactor 200 ends to be switched on due to misoperation, an upward movement of the second slider 320 is locked, and thus an upward movement of the second movable iron core assembly is locked, thereby preventing the second contactor 200 from being switched on. After that, in the case where the first contactor 100 is switched off and the second contactor 200 is switched on, the first movable iron core assembly can move down freely, and drive the first slider 310 to move down—since in this situation, the lower interlocking portion 331 does not block the downward movement of the first slider 310, allowing the interlocking portion 331 and thus the blocking of the second slider 320 to be released, and then the second movable iron core assembly can drive the second slider 320 to move up, during which, the housing 330 cannot not be moved up and down under potential frictional forces due to it has been fixed.

Furthermore, it is apparent that such fixation of the housing allows the reverse screwing of the screw 337 as needed, thereby allowing the disassembly of the housing 330, and thus allowing the interlock module 300 to be removed from the first contactor 100 and the second contactor 200. And in this case, in an embodiment in which the first contactor 100 and the second contactor 200 are both fixed to the base plate 400, there is no need to provide any feature (such as threaded hole, etc.) in the base plate 400 for fixing the housing 330.

According to a variant not illustrated, in place of the above-described screw and nut assembly, in the case where the first contactor 100 and the second contactor 200 are fixed to the base plate 100, a threaded hole is provided in the base plate 400 between the two first contactor 100 and the second contactor 200, and a screw is provided in the housing 330. The above step 6 comprises screwing the screw to the threaded hole of the base plate 400, to realize the fixing of the housing 330 relative to base plate 400.

In additional, the present invention also relates to an interlock module 300 for implementing the above method.

For example, as described above, the first contactor 100 and the second contactor 200 are provided side by side with a gap therebetween, the first contactor 100 having a first mounting surface 101 and a first movable iron core assembly (not illustrated), the second contactor 200 having a second mounting surface 201 which facing the first mounting surface 101 and a second movable iron core assembly (not illustrated).

According to the interlocking module 300 of the present invention, there is a first slider 310, a second slider 320 and a housing 330 formed separately from the first slider 310 and the second slider 320. And further specifically, the first slider 310 and second slider 320 can be mirror of each other.

The first slider 310 is intended to be connected to the first movable iron core assembly of the first contactor 100. To this end, in a specific embodiment, the first slider 310 may be provide with a first pin 313 protruding with respect to its first body 312, while the first movable iron core assembly may be provided with a first mounting hole (not illustrated) into which the first pin 313 of the first slider 310 may be extended, for example through a hole (not illustrated) in the first mounting surface 101, to enable the mechanical connection of the first slider 310 with the first movable iron core assembly, and thus enabling the upward and downward movement of the first movable iron core assembly to cause the upward and downward movement of the first slider 310.

Correspondingly, the second slider 320 is intended to be connected to the second movable iron core assembly of the second contactor 200. To this end, in one specific embodiment, the second slider 320 may be provided with a second pin 323 protruding with respect to its second body 322, while the second movable iron core assembly may be provided with a second mounting hole (not illustrated) into which the second pin 323 of the first slider 320 may be extended, for example through a hole (not illustrated) in the first mounting surface 201, to enable mechanical connection of the second slider 320 with the second movable iron core assembly, and thus enabling thus enabling the upward and downward movement of the second movable iron core assembly to cause the upward and downward movement of the second slider 310.

The housing 330 is provided with an interlocking portion 331, as described above, which is configured to interact with the first slider 310 and the second slider 320 to produce an interlocking effect. That is, for example, in the case where the first contactor 100 is switched on, the first slider 310 and the second slider 320 can cooperate with the interlocking portion 331 to produce an interlocking effect to block the second contactor 200 from being switched on; and vice versa. More specifically, as illustrated in FIG. 3, in the case where the first contactor 100 is switched on and the second contactor 200 is switched off, the first slider 310 is in the upper position with the first movable core assembly, and the second slider 320 is in the lower position with the second movable core assembly, the interlocking portion 331 being stuck between the first mating interlocking portion 311 and the second mating interlocking portion 321 of the second slider 320 in the housing 330 of the interlocking module 300, and at this time, if the second contactor 200 tends to be switched on due to misoperation, the upward movement of the second slider 320 is blocked, and therefore the upward movement of the second movable core assembly is blocked, thereby preventing the second contactor 200 from being switched on. After that, in the case where the first contactor 100 is switched off and the second contactor 200 is switched on, since the interlocking portion 331 does not block the downward movement of the first slider 310, the first movable core assembly can move downward freely, and thus can drive the first slider 310 to move downwards, so that the interlocking portion 331 is released and thus the block to the second slider 320 is released, and thus the second movable core assembly can drive the second slider 320 to move upward, thereby realizing the switching on of the second contactor 200.

Furthermore, as above, in order to achieve the assembly of the housing 330 with the first slider 310 and the second slider 320, a side of the housing 330 is provided with a notch 332, and the housing 330 is provided with a first receptacle 334 and a second receptacle (not illustrated) communicating with the notch 332, the first receptacle 334 being intended for receiving the first slider 310 through the notch 332, the second receptacle 334 being intended for receiving the second slider 320 through the notch 332. FIG. 3 shows the first slider 310 and the second slider 320 are in the first receptacle and the second receptacle in the housing 330.

More specifically, as described above and as illustrated in FIG. 2, the first receptacle 314 is at least defined by a first outer side 335 of the housing 330 in which a first channel 336 may be provided to allow the first pin 313 of the first slider 310 to pass through. And accordingly, the second receptacle is at least defined by a second outer side of the housing which is opposite to the first outer side 335 and in which a second channel (not illustrated) is provided to allow the second pin 323 to pass through. Thus, the provision of first channel 336 and the second channel makes it possible to let the first pin 313 and the second pin 323 enter the first channel 336 and the second channel respectively when mounting the housing 300 to the first slider 310 and the second slider 320 after having mounted the first slider 310 and the second slider to the respective first contactor 100 and the second contactor 200 through the first pin 313 and the second pin 323 respectively, enabling the guiding of the movement of the housing 330 while allowing the assembly of the latter, and enabling the guiding of the first slider 310 and respectively the second slider relative to the housing 330 during the operation of the interlocking module, i.e., the first slider 310 and the second slider 320 may be arranged to be able to move upward and downward in the first receptacle 314 and the second receptacle respectively during the operation of the interlocking module 300, such as during the switching between the first contactor 100 and the second contactor 200.

In a specific implementation, the housing 330 of the interlock module 300 is provided with at least one screw and nut assembly including the a screw 337 and a nut 338 cooperating with each other, and an abutment surface 349 for the head 339 of the screw 337. The nut 338 works in collaboration with the stopper 102 arranged on the first mounting surface 101 of the first contactor 100 and/or on the second mounting surface 201 of the second contactor 200 (in the figure, only the case in which the stopper 102 is provided in the first contactor 100 is shown). The stopper 102 is provided with for example a side stopper surface 103 and a top stopper surface 104 for stopping nut 338. Wherein, in an initial position, the screw and nut assembly is entirely accommodated inside the housing 330; while in an assembled position, by screwing the screw 337, the head 339 of the screw 337 can abut against the abutment surface 349, and at least a portion of the nut 338 can enter the stopper 102 and be stopped by the latter. In this case, a screw and nut assembly can be used to fix the housing 330 with respect to the first contactor 100 and the second contactor 200, and the specific form of the screw and nut assembly and the stopper 102 and the process of fixing the housing 330 can be described above in respect of sub-steps 6.1, 6.2 and 6.3 (it will not be repeated here).

It should be noted that, as illustrated in FIG. 2, two screw and nut assemblies can be mounted in housing 330 to cooperate with a stopper in the first contactor 100 and a stopper in the second contactor 200, respectively, to allow for more stable and reliable fixation. In particular, in case where the housing 330 is formed by interconnecting a first half housing 350 and a second half housing 360, at least one screw-nut assembly may be provided on each of the first half housing 350 and the second half housing 360.

Furthermore, it is apparent that such fixation of the housing allows the reverse screwing of the screw 337 as needed, thus allowing the disassembly of housing 330 and thus the disassembly of the interlock module 300 from the first contactor 100 and the second contactor 200. And in this case, in an embodiment where the first contactor 100 and the second contactor 200 are both fixed to the base plate 400, there is no need to provide any feature (such as threaded holes, etc.) in the base plate 400 for fixing the housing 330.

According to a variant not illustrated, in the case that the first contactor 100 and the second contactor 200 are fixed to the base plate 400, in place of the screw and nut assembly described above, a threaded hole may be provided in the base plate 400 between the first contactor 100 and the second contactor 200 and a screw may be provided in the housing 330 And the step 6 above comprises screwing the screw to the threaded hole in the base plate 400 to fix the housing 330 with respect to the base plate 400.

The exemplary embodiments of the present invention have been described in detail above with reference to the preferred embodiments. However, those skilled in the art can understand that, without departing from the concept of the present invention, various modifications can be made to the above-mentioned specific embodiments. Variations and modifications, and various combinations of various technical features and structures proposed by the present invention can be made without exceeding the protection scope of the present invention.

The scope of the present disclosure is defined not by the above-described embodiments, but by the appended claims and their equivalents.

REFERENCE NUMBER

100 first contactor
101 first mounting surface
102 stopper
103 side stopper surface
104 top stopper surface
100 second contactor
201 second mounting surface
250 front face
300 interlock module
310 first slider
311 first mating interlocking portion
312 first body
313 first pin
320 second slider
321 second mating interlocking portion
322 second body
323 second pin
330 housing
331 interlocking portion
332 notch
334 first receptacle
335 first outer side
336 first channel
337 screw
338 nut
339 head of a screw
340 protrusion
349 abutment surface
400 base plate

What is claimed is:

1. A method for mounting an interlock module between two contactors, wherein the interlock module is configured, in an assembled state, to ensure that in the case where one of the two contactors is switched on, the switching on of the other of the two contactors is blocked, the method is characterized in that it comprises at least the following steps:

Step 1: Providing two contactors, including a first contactor having a first mounting surface and a first movable iron core assembly and a second contactor having a second mounting surface and a second movable iron core assembly, and placing the first contactor and the second contactor side by side with a gap therebetween, so that the first mounting surface faces the second mounting surface, Step 2: Providing the interlock module comprising a first slider, a second slider and a housing formed separately from the first slider and the second slider, an interlocking portion being mounted in the housing for interacting with the first slider and the second slider to generate an interlocking effect, Step 3: Connecting the first slider to the first movable iron core assembly of the first contactor through the first mounting surface, Step 4: Connecting the second slider to the second movable iron core assembly of the second contactor through the second mounting surface, Step 5: Assembling the housing to the first slider and the second slider, Step 6: Removably fixing the housing, wherein the order of step 3 and step 4 can be interchanged, at least one screw and nut assembly comprising a screw and a nut cooperating with each other is provided in the housing of the interlock module provided in step 1, a stopper being provided in the first mounting surface of the first contactor and/or the second mounting surface of the second contactor and being provided with a side stopper surface and a top stopper surface, wherein the above step 6 comprises a sub-step 6.1: rotating the screw along a locking direction by a certain angle to bring the nut to enter the stopper, so that the nut can be stopped by abutting against the side stopper surface, during which there is no relative rotation between the screw and the nut.

2. The method as claimed in claim 1, wherein the method further comprises:

Step a: fixing the first contactor, wherein the step a can take place before step 3, Step b: fixing the second contactor, wherein the step b can take place before step 4.

3. The method as claimed in claim 2, wherein the step a comprises fixing the first contactor to a base plate, and the step b comprises fixing the second contactor to the base plate.

4. The method as claimed in claim 3, wherein a threaded hole is provided in the base plate between the first contactor and the second contactor, while a screw is provided in the housing, the Step 6 comprises screwing the screw to the threaded hole.

5. The method as claimed in claim 1, wherein the above step 6 further comprises a sub-step 6.2:

continuing screwing the screw in the locking direction, so as to rotate the screw relative to the nut, until the head of the screw abuts against an abutment surface on the housing.

6. The method as claimed in claim 5, wherein the above step 6 further comprises a sub-step 6.3:

continuing screwing the screw in the locking direction, so as to rotate the nut relative to the screw until the nut is stopped by abutting against the top stopper surface.

7. The method as claimed in claim 1, wherein the first slider and the second slider are respectively provided with a first pin and a second pin, while the first movable iron core assembly of the first contactor is provided with a first mounting hole, and the second movable iron core assembly of the second contactor is provided with a second mounting hole, wherein the step 3 comprises mounting the first pin of the first slider into the first mounting hole of the first movable iron core assembly of the first contactor, and the step 4 comprises mounting the second pin of the second slider into the second mounting hole of the second movable iron core assembly of the second contactor.

8. The method as claimed in claim 1, wherein in the interlock module provided in the step 1, the housing is provided with a notch located on a side and a first receptacle and a second receptacle communicating with the notch, and the step 5 comprises:

Sub-step 51: moving the housing along a mounting direction, so that the first slider and the second slider enter the first receptacle and the second receptacle through the notch respectively;

Sub-step 52: continuing moving the housing along the mounting direction to reach an assembling position.

9. An interlock module for interlocking between two contactors, wherein the interlock module is used to ensure that when one of the two contactors is switched on, the switching on of the other of the two contactors is blocked, characterized in that the interlocking module includes:

a first slider, for connecting to a first movable iron core assembly of the first contactor of the two contactors, a second slider, for connecting to a second movable iron core assembly of the second contactor of the two contactors, a housing, formed separately from the first slider and the second slider, and provided with an interlocking portion for interacting with the first slider and the second slider to produce an interlocking effect, at least one screw and nut assembly comprising a screw and a nut cooperating which each other is provided in the housing for removably fixing the housing, wherein:

the screw comprises a head, while the housing comprises an abutment surface for abutting the head, the nut is configured to cooperate with a stopper provided on the first contactor and/or the second contactor, wherein, in an initial position, the nut is located inside the housing; and in an assembled position, screwing the screw enables the head of the screw to abut against the abutment surface, and enables the nut to enter the stopper and be stopped.

10. The interlock module as claimed in claim 9, wherein a side of the housing is provided with a notch, and the housing is provided with a first receptacle and a second receptacle communicating with the notch, the first receptacle being used for receiving the first slider through the notch, and the second receptacle is used for receiving the second slider through the notch.

11. The interlock module as claimed in claim 10, wherein:

the first slider is provided with a first pin protruding relative to a first body of the first slider for cooperating with a first mounting hole in the first movable iron core assembly of the first contactor, the second slider is provided with a second pin protruding from a second body of the second slider for connecting with a second mounting hole in the second movable iron core assembly of the second contactor cooperation.

12. The interlock module as claimed in claim 11, wherein:

the first receptacle is defined at least by a first outer side of the housing in which a first channel is provided to allow the passage of the first pin, the second receptacle is defined by at least a second outer side of the housing which is opposite to the first outer side and in which a second channel is provided to allow the passage of the second pin.

13. The interlock module as claimed in claim 9, wherein the first slider and the second slider are configured as a mirror image of each other.

14. A control system, comprising a first contactor and a second contactor, and the interlock module as claimed in claim 9.

15. The control system as claimed in claim 14, wherein the first contactor and the second contactor are arranged side by side, and comprise respectively a first mounting surface first and a second mounting surface facing each other, wherein the first slider is connected to the first movable iron core assembly of the first contactor through the first mounting surface, and the second slider is connected to the second movable iron core assembly of the second contactor through the second mounting surface.

16. The control system as claimed in claim 15, wherein the stopper is provided in the first mounting surface and/or the second mounting surface, and comprises a side stopper surface and a top stopper surface for stopping the nut, and wherein, the first slider and the second slider are configured as a mirror image of each other.

* * * * *